(12) United States Patent  
Rajakarunanayake et al.

(10) Patent No.: US 8,091,011 B2
(45) Date of Patent: Jan. 3, 2012

(54) METHOD AND SYSTEM FOR DYNAMICALLY ADJUSTING FORWARD ERROR CORRECTION (FEC) RATE TO ADAPT FOR TIME VARYING NETWORK IMPAIRMENTS IN VIDEO STREAMING APPLICATIONS OVER IP NETWORKS

(75) Inventors: Yasantha Nirmal Rajakarunanayake, San Ramon, CA (US); Marcus Kellerman, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 1113 days.

(21) Appl. No.: 11/869,537

(22) Filed: Oct. 9, 2007

(65) Prior Publication Data

US 2009/0092152 A1   Apr. 9, 2009

(51) Int. Cl.
*H03M 13/00* (2006.01)

(52) U.S. Cl. ....... 714/774; 714/47.1; 714/701; 714/704; 714/746; 714/748; 714/751; 714/752; 714/758; 714/776; 714/781; 714/793; 714/799

(58) Field of Classification Search .................. None
See application file for complete search history.

(56) References Cited

U.S. PATENT DOCUMENTS

| | | | | |
|---|---|---|---|---|
| 6,691,274 | B1 * | 2/2004 | Olds et al. | 714/752 |
| 7,257,664 | B2 * | 8/2007 | Zhang | 714/748 |
| 7,295,549 | B2 * | 11/2007 | Pepin et al. | 370/352 |
| 7,483,389 | B2 * | 1/2009 | Tong et al. | 370/253 |
| 2004/0039979 | A1 * | 2/2004 | Garani | 714/752 |
| 2005/0262419 | A1 * | 11/2005 | Becker et al. | 714/758 |
| 2007/0204196 | A1 * | 8/2007 | Watson et al. | 714/751 |
| 2007/0217355 | A1 * | 9/2007 | de La Chapelle et al. | 370/328 |
| 2008/0168312 | A1 * | 7/2008 | Banks et al. | 714/39 |
| 2008/0274690 | A1 * | 11/2008 | Laufer | 455/13.4 |
| 2009/0219990 | A1 * | 9/2009 | Han et al. | 375/240.02 |

* cited by examiner

*Primary Examiner* — John Trimmings
(74) *Attorney, Agent, or Firm* — Thomas, Kayden, Horstemeyer & Risley LLP.

(57) ABSTRACT

Certain aspects of a method and system for dynamically adjusting forward error correction (FEC) rate to adapt for time varying network impairments in video streaming applications over IP networks may be disclosed. At a server side of a client-server communication system, a rate of transmission of forward error correction (FEC) packets to one or more clients may be dynamically adjusted based on receiving at least one upstream FEC packet from a plurality of clients. The rate of transmission of the FEC packets to the plurality of clients may be increased when a rate of occurrence of lost data packets is above a particular threshold value. The upstream FEC packets may comprise an urgent packet requesting transmission of a particular FEC packet in order to recover one or more particular lost data packets.

24 Claims, 10 Drawing Sheets

Packets included in Checksum calculation

Packets excluded from Checksum calculation

METHOD AND SYSTEM FOR DYNAMICALLY ADJUSTING FORWARD ERROR CORRECTION (FEC) RATE TO ADAPT FOR TIME VARYING NETWORK IMPAIRMENTS IN VIDEO STREAMING APPLICATIONS OVER IP NETWORKS

CROSS-REFERENCE TO RELATED APPLICATIONS/INCORPORATION BY REFERENCE

None

FIELD OF THE INVENTION

Certain embodiments of the invention relate to error correction codes. More specifically, certain embodiments of the invention relate to a method and system for dynamically adjusting forward error correction (FEC) rate to adapt for time varying network impairments in video streaming applications over IP networks.

BACKGROUND OF THE INVENTION

In an ideal situation, a transmitter may transmit information over a channel or medium and the transmitted information may be received without alteration and processed by a receiver. However, a transmission medium or channel may be constantly subjected to impairments such as noise and interference. Consequently, when a transmitter transmits information, a receiver may not receive the information in an identical manner in which it was transmitted. This may be due to impairments in a channel that may typically introduce errors in the transmitted information. A transmitter may code the data in such a manner that error introduced during transmission may be detected and/or corrected during reception.

In telecommunication, forward error correction (FEC) is a system of error control for data transmission, whereby the sender adds redundant data to its messages, which allows the receiver to detect and correct errors without the need to ask the sender for additional data. The advantage of forward error correction is that retransmission of data can often be avoided, at the cost of higher bandwidth requirements on average, and is therefore applied in situations where retransmissions are relatively costly or impossible.

Today's Internet Protocol Television (IPTV) applications require movement of large data files and content that may include gigabytes of data across IP networks. These IP networks may include carrier access networks such as digital subscriber line (DSL) and/or cable networks, the public Internet or local wired and wireless LANs in customer premises. The IP networks may be capable to transport data packets, but by nature are best effort networks. In other words, if unexpected network conditions such as congestion is encountered, data packets may be dropped based on certain policies. The use of transport control protocol (TCP), an upper layer protocol above IP, may enable requesting retransmission of the lost packets from the origin, and therefore guaranteeing reliability at the expense of possible latency. The TCP/IP may be useful for non-time critical data, for example, unicast data between a server and a client. However, in many cases such as broadcast video, the same content may reach thousands of customers, and multicast IP network delivery may be the best available choice and in such cases, TCP/IP may be unsuitable.

The real-time transport protocol (RTP) may be enabled to provide end-to-end delivery services for data with real-time characteristics such as interactive audio and video applications. Applications typically run RTP above the user datagram protocol (UDP) to make use of its multiplexing and checksum services. The RTP protocol may support data transfer to multiple destinations using multicast distribution if provided by the underlying network.

The use of protocols based on UDP may be capable of multicast operation, but may be unable to request retransmissions. In such cases, a forward error correction code (FEC) may be utilized to recover lost packets in transit over UDP. The Reed-Solomon error correction is an error-correcting code that works by oversampling a polynomial constructed from the data. The polynomial may be evaluated at several points, and these values are sent or recorded. By sampling the polynomial more often than is necessary, the polynomial may be over-determined. As long as many of the points are received correctly, the receiver can recover the original polynomial even in the presence of a few bad points. The Reed-Solomon error correction may require multiplicative operation and dedicated hardware coprocessors, as multiplication and division are expensive for general purpose CPUs in terms of clock cycles.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and/or system for dynamically adjusting forward error correction (FEC) rate to adapt for time varying network impairments in video streaming applications over IP networks, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and systems for dynamically adjusting a forward error correction (FEC) rate to adapt for time varying network impairments in video streaming applications over IP networks. At a server side of a client-server communication system, a rate of transmission of forward error correction (FEC) packets to one or more clients may be dynamically adjusted based on receiving at least one upstream FEC packet from a plurality of clients. The rate of transmission of the FEC packets to the plurality of clients may be increased when a rate of occurrence of lost data packets is above a particular threshold value. The upstream FEC packets may comprise an urgent packet requesting transmission of a particular FEC packet in order to recover one or more particular lost data packets.

Figure 1:
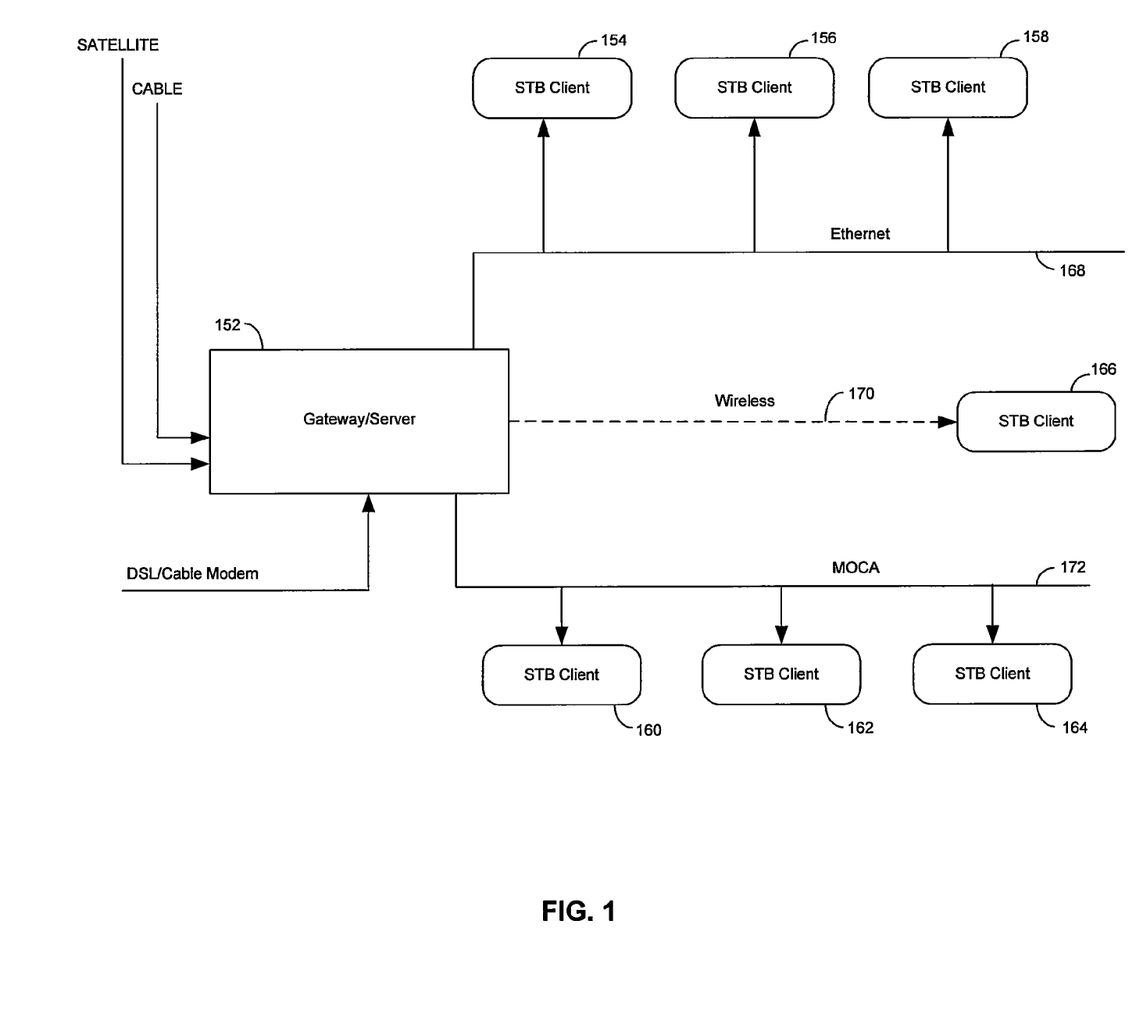
FIG. 1 is a block diagram of an exemplary IPTV communication system, in accordance with an embodiment of the invention.

FIG. 1 is a block diagram of an exemplary IPTV communication system, in accordance with an embodiment of the invention. Referring to FIG. 1, there is shown an IP gateway and/or server 152 and a plurality of IP set-top box (STB) clients 154, 156, 158, 160, 162, 164 and 166. The plurality of IP STB clients 154, 156 and 158 may be coupled to the IP gateway and/or server 152 via a wired network, for example, an Ethernet network 168. The IP STB client 166 may be coupled to the IP gateway and/or server 152 via a wireless network 170. The plurality of IP STB clients 160, 162 and 164 may be coupled to the IP gateway and/or server 152 via a wired network, for example, a media over coaxial cable (MOCA) network 172. Notwithstanding, the invention may not be so limited and the plurality of IP STB clients 154, 156, 158, 160, 162, 164 and 166 may be coupled to the IP gateway and/or server 152 via other wired and/or wireless networks. The exemplary IPTV communication system may be embodied in, for example, a home LAN or a corporate LAN with a network bandwidth and capacity that may be higher than the required bandwidth for playing smooth audio or video applications.

The IP gateway and/or server 152 may comprise suitable logic, circuitry and/or code that may be enabled to transmit and/or receive audio, video and/or networking data packets via satellite, cable and/or a DSL/cable modem, for example. The IP gateway and/or server 152 may be a digital media server (DMS), for example. The IP gateway and/or server 152 may be enabled to communicate the received audio, video and/or networking data packets to one or more IP STB clients. The IP gateway and/or server 152 may be enabled to broadcast audio, video and/or networking data packets to thousands of clients via multicast IP network delivery using RTP over UDP. The RTP protocol may support data transfer to multiple destinations using multicast distribution.

Figure 2A:
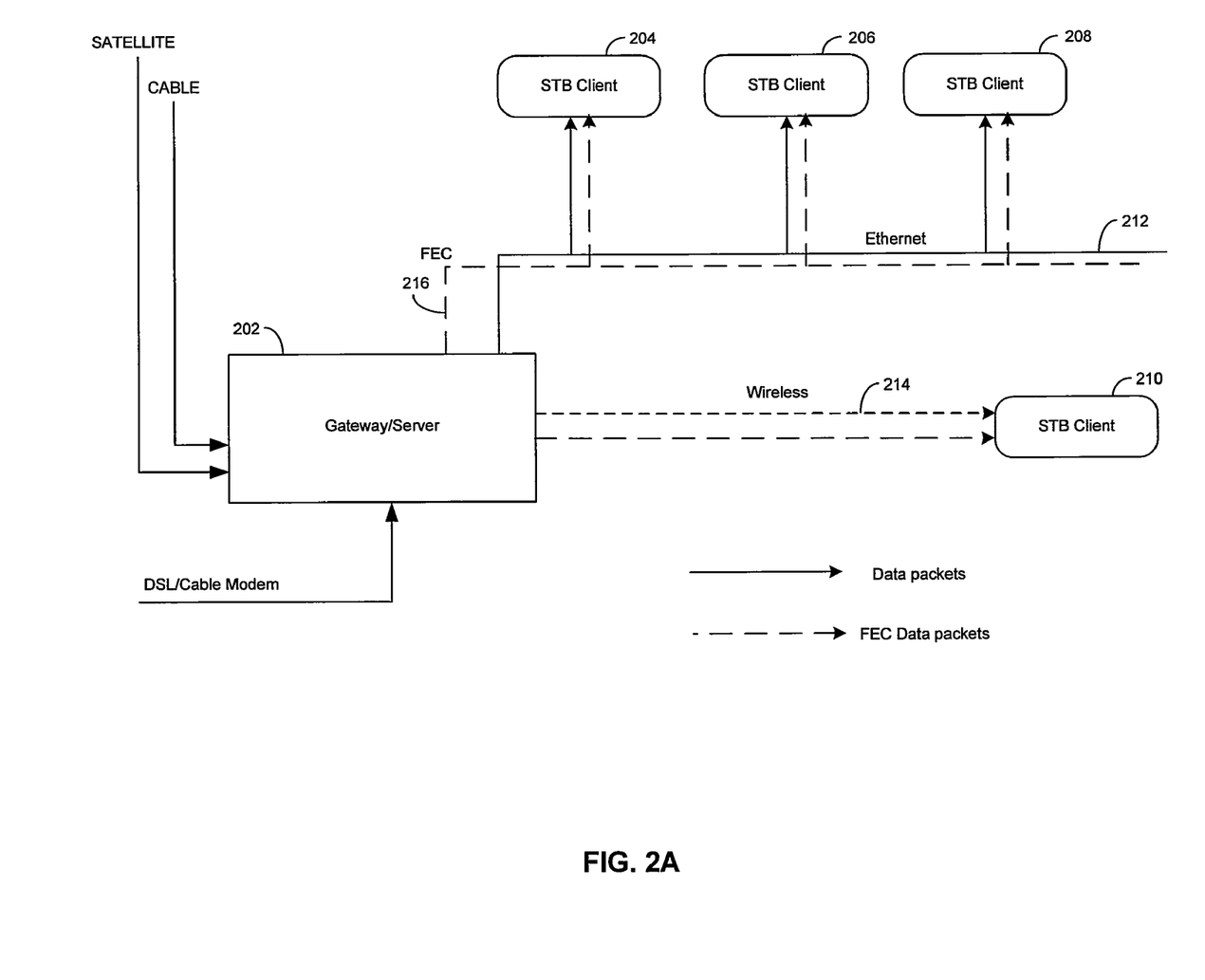
FIG. 2A is a block diagram of an exemplary IPTV communication system illustrating receipt of FEC packets, in accordance with an embodiment of the invention.

FIG. 2A is a block diagram of an exemplary IPTV communication system illustrating receipt of FEC packets, in accordance with an embodiment of the invention. Referring to FIG. 2A, there is shown an IP gateway and/or server 202 and a plurality of IP STB clients 204, 206, 208 and 210. The plurality of IP STB clients 204, 206 and 208 may be coupled to the IP gateway and/or server 202 via a wired network, for example, an Ethernet network 212. The IP STB client 210 may be coupled to the IP gateway and/or server 202 via a wireless network 214. Notwithstanding, the invention may not be so limited and the plurality of IP STB clients 204, 206, 208 and 210 may be coupled to the IP gateway and/or server 202 via other wired and/or wireless networks.

The IP gateway and/or server 202 may be enabled to communicate audio, video and/or networking data packets to one or more IP STB clients. The IP gateway and/or server 202 may also be enabled to transmit one or more forward error correction code (FEC) packets 216 periodically after a particular number of transmitted data packets. Each of the plurality of IP STB clients 204, 206, 208 and 210 may be enabled to parallelly receive the transmitted FEC packets 216 from the IP gateway and/or server 202 via a separate sideband.

Figure 2B:
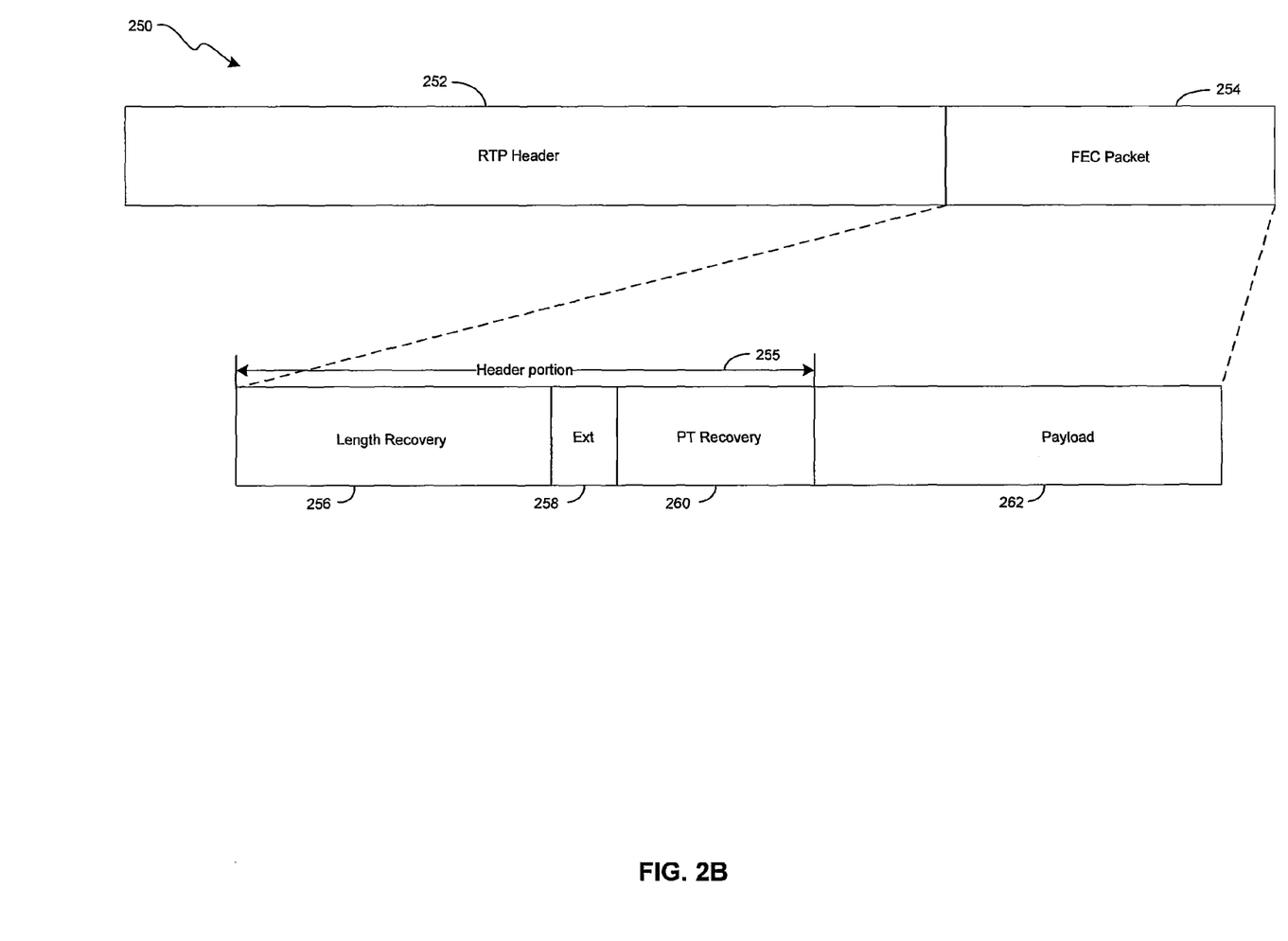
FIG. 2B is a diagram illustrating an exemplary packet structure of a RTP FEC packet that may be utilized in connection with an embodiment of the invention.

FIG. 2B is a diagram illustrating an exemplary packet structure of a RTP FEC packet that may be utilized in connection with an embodiment of the invention. Referring to FIG. 2B, there is shown a RTP FEC packet 250. The RTP FEC packet 250 may comprise a RTP header portion 252 and a FEC packet portion 254. The FEC packet portion 254 may comprise a FEC header portion 255 and a FEC payload portion 262. The FEC header portion 255 may comprise a length recovery field 256, an extension field 258 and a packet type recovery field 260 among other fields.

The RTP header portion 252 may comprise a plurality of fields, for example, a version field that identifies the version of the RTP, a padding field that indicates whether the packet comprises one or more additional zeros that are not part of the payload, a sequence number field that may comprise a sequence number that is one higher than the sequence number of the previously transmitted data packet, a synchronization source (SSRC) field and a contributing source (CSRC) field.

The length recovery field 256 may be utilized to determine the length of any recovered lost data packets. The value of the length recovery field 256 may be computed by XORing the lengths (in bytes) of the data payloads associated with the FEC packet portion 254. For example, if the lengths of two data packets are 3 (0b011) and 5 (0b101) bytes, respectively, the length recovery field 256 may be encoded as 0b011 XOR 0b101=0b110.

The extension field 258 may indicate a header extension. When the extension field 258 is set to 1, it may indicate that an additional 32 bits of header may follow, for example. The PT recovery field 260 may be set to a function f( ), for example, XOR function applied to the payload types of the data packets associated with the FEC packet portion 254.

The FEC payload portion 262 may comprise a function f( ) operator, for example, an exclusive OR (XOR) operator applied to the payloads of the data packets associated with the FEC packet portion 254. In accordance with an embodiment of the invention, if the payloads are not of equal length, they may be padded with zeroes to be as long as the longest payload before computing the function f( ).

In operation, if one of the IP STB clients, for example, IP STB client 204 has received a plurality of data packets and FEC packets, but one or more of the plurality of data packets with sequence number Xi is lost in transit, the lost data packet with sequence number Xi may be recovered. The IP STB client 204 may determine whether it has received sufficient data packets in order to recover the lost data packet with sequence number Xi. For example, the IP STB client 204 may receive an FEC packet portion 254 associated with the lost data packet with sequence number Xi, and a plurality of data packets associated with the FEC packet portion 254.

Figure 3:
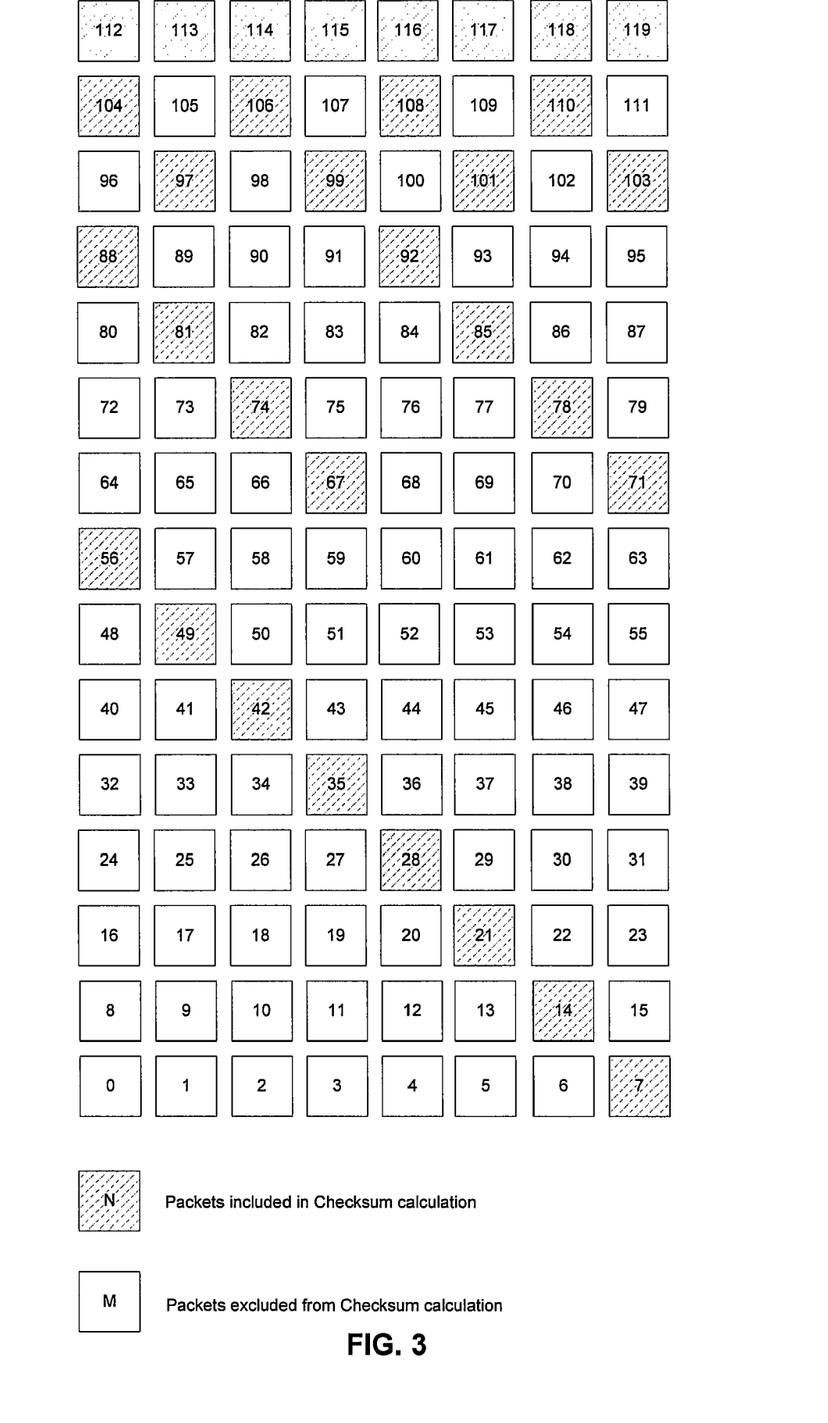
FIG. 3 is a diagram illustrating exemplary selection of a subset of data packets included in a FEC checksum calculation, in accordance with an embodiment of the invention.

FIG. 3 is a diagram illustrating exemplary selection of a subset of data packets included in FEC checksum calculation, in accordance with an embodiment of the invention. Referring to FIG. 3, there is shown a plurality of data packets, for example, 120 data packets, 0, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118 and 119 received by a receiver, for example, the IP STB client 204.

In accordance with an embodiment of the invention, a selected subset of the plurality of data packets may be included in the FEC checksum calculation. For example, the plurality of data packets 7, 14, 21, 28, 35, 42, 49, 56, 67, 71, 74, 78, 81, 85, 88, 92, 97, 99, 101, 103, 104, 106, 108, 110, 112, 113, 114, 115, 116, 117, 118 and 119 may be included in the FEC checksum calculation. The plurality of data packets with depth D equal to, for example, 120 data packets may be arranged in a row interval of interleave I equal to 8 data packets, for example. The plurality of data packets may be encapsulated in RTP protocol, which may provide a 16-bit sequence number for each packet.

The plurality of data packets encapsulated in RTP may be received from a network driver and the socket buffers associated with each data packet may be queued in an input queue at the IP gateway and/or server 202. In accordance with an embodiment of the invention, a 256 packet holding queue may be utilized before selecting a subset of the data packets for FEC checksum calculation. Each new arriving packet may be added to the tail of the queue. If the queue length reaches a particular threshold value, for example, a depth of 256 data packets, one or more received data packets may be dequeued and transmitted to a decoder or upper layer software, for example. The FEC packets may be queued in a separate FEC queue, for example, with a depth of about 32 FEC packets in the FEC queue.

The receiver, for example, each IP STB client may be enabled to determine the particular lost data packets that may be recovered based on the sequence number field in the RTP header of the received FEC packet. In accordance with an embodiment of the invention, a FEC sequence number (x) may be enabled to recover the lost data packets among the plurality of data packets transmitted with sequence numbers equal to x−N+F(i), where x is the sequence number of the FEC packet, N is the number of recently transmitted data packets and F(i) is the selected subset of data packets included in FEC checksum calculation. For example, if sequence number of the FEC packet, x=121, the number of recently transmitted data packets, N=120 and F(i)={7, 14, 21, 28, 35, 42, 49, 56, 67, 71, 74, 78, 81, 85, 88, 92, 97, 99, 101, 103, 104, 106, 108, 110, 112, 113, 114, 115, 116, 117, 118, 119}, where the values of I may span over the numbers in the above set of 32 values, the receiver, for example, IP STB client 204 may be enabled to recover one of the lost data packets among the plurality of data packets transmitted with sequence numbers in the set {8, 15, 22, 29, 36, 43, 50, 57, 68, 72, 75, 79, 82, 86, 89, 93, 98, 100, 102, 104, 106, 108, 109, 111, 113, 114, 115, 116, 117, 118, 119, 120}.

When the plurality of data packets are received by a receiver, for example, the IP STB client 204, a data packet that is lost during transmission may be detected based on the sequence number of the received data packets. For example, if the IP STB client 204 receives data packets with sequence numbers, 1001, 1002, 1004 and 1005, the IP STB client 204 may detect that the data packet with sequence number 1003 is lost in transit. The plurality of received data packets may be stored in a holding packet buffer, where the lost data packet may be empty.

When a FEC packet is received by a receiver, for example, the IP STB client 204, the number of lost data packets may be calculated. If the IP STB client 204 determines that only one data packet is lost, then a checksum may be computed excluding the lost data packet from the holding packet buffer. The lost data packet may be recovered by applying a linear function, for example, XORing the calculated checksum with the FEC checksum. One or more fields of the FEC packet may be replaced with the recovered data packet, and may be inserted into the holding packet buffer with the correct sequence number in the receiver, for example, the IP STB client 204. This process of correction may consume the FEC packet and generate a recovered data packet. As each lost data packet is recovered, prior FEC packets may be reused to recover more lost data packets.

In accordance with an embodiment of the invention, at least one FEC packet may be received periodically after receiving a particular number of the plurality of data packets. For example, at least one FEC packet may be received periodically after receiving $2^N$ data packets, where N is equal to a number of lost data packets and $2^N$ may be referred to as the interleave I. If one or more FEC packets are lost, the receiver, for example, the IP STB client 204 may wait for more FEC packets to arrive. The average lost data packet rate of the network, for example, Ethernet 212 may be below (1/I). If the number of transmitted FEC packets are above the rate 1/I, then more lost data packets may be recovered by the FEC packets. If duplicate FEC packets are received by the receiver, for example, the IP STB client 204, they may be discarded.

If one or more of the plurality of received data packets are variable length data packets, the FEC checksum may be calculated by padding each of the plurality of received variable length data packets with one or more zeros up to a maximum transmission unit (MTU) size, for example. A second checksum may be calculated by excluding a sequence number field of each of the plurality of received variable length data packets. The FEC checksum may be calculated prior to UDP processing of the plurality of data packets by a TCP/IP stack as the UDP headers in the FEC packet may be scrambled during checksum calculation and may not be passable to an upper layer stack.

In accordance with an embodiment of the invention, a binary search technique may be utilized to select a subset of data packets to be included in the FEC checksum calculation. A subset of data packets to be included in the FEC checksum calculation may be selected from a number (D) of data packets required to recover N lost data packets may be equal to $(2^{N+1}-1)*(2^N)$, where interleave I may be equal to $2^N$. For example, if the number of lost data packets, N=3, the interleave I may be equal to 8 and the depth D may be equal to 15×8=120 data packets. A FEC packet may be transmitted after every 8 data packets and any given FEC packet may be enabled to recover at least one lost data packet within the last 120 received data packets.

In accordance with another embodiment of the invention, the number of lost data packets that may be recovered may be increased by increasing a holding buffer size of the FEC packet. The method may be suited for CPU oriented error recovery as the mathematical operations such as XOR operations are linear and may be completed in a single clock cycle of the CPU between two operands. The method may be scalable to multi processing or hardware acceleration and may be advantageous compared to other FEC techniques, which may require multiplicative operation. For example, Reed-Solomon FEC codes may require dedicated hardware coprocessors for implementation, as multiplication and division may be expensive for general purpose CPUs in terms of clock cycles. The method may be tunable based on a rate of occurrence of lost data packets and reduce the bandwidth consumed by the FEC packets.

Figure 4:
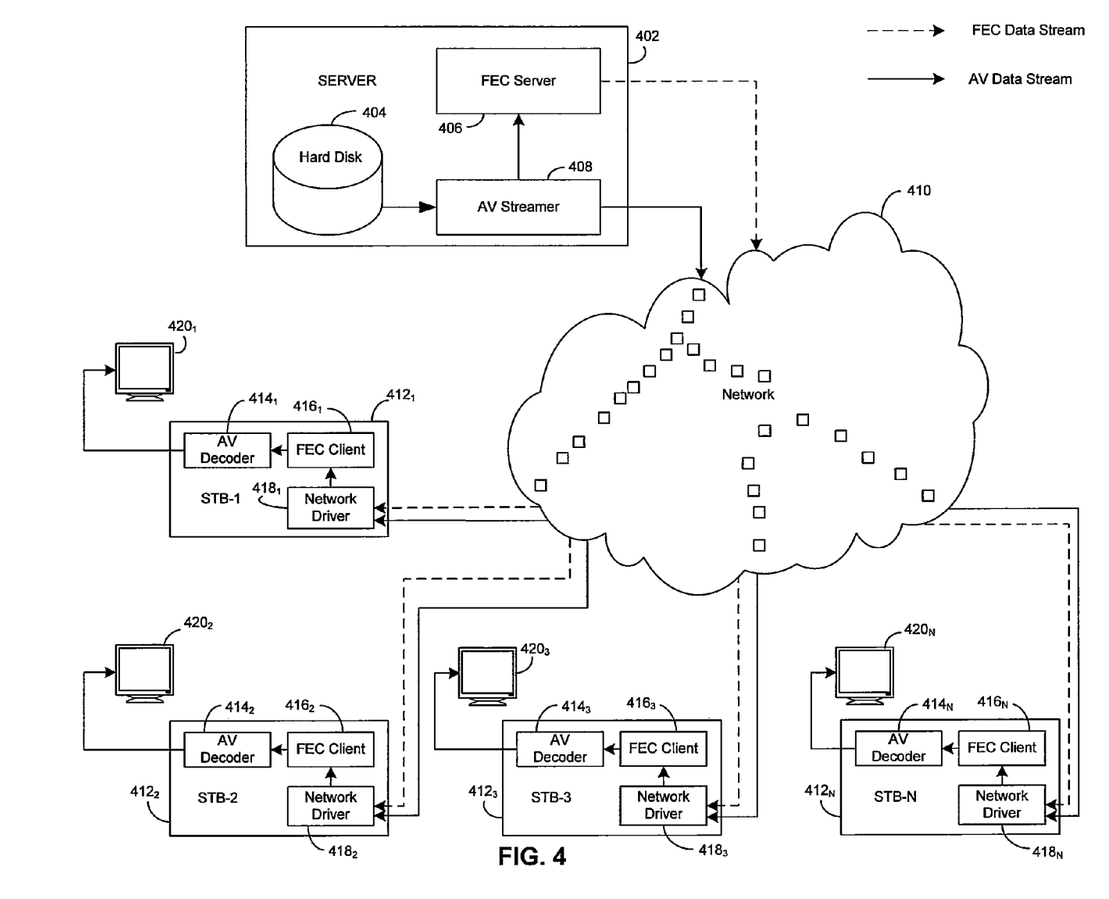
FIG. 4 is a block diagram of an exemplary client-server communication system illustrating multicast of a data stream along with transmission of a corresponding FEC data stream, in accordance with an embodiment of the invention.

FIG. 4 is a block diagram of an exemplary client-server communication system illustrating multicast of a data stream along with transmission of a corresponding FEC data stream, in accordance with an embodiment of the invention. Referring to FIG. 4, there is shown a server 402, a network 410, a plurality of clients, STB-1 412$_1$ coupled to a display system 420$_1$, STB-2 412$_2$ coupled to a display system 420$_2$, . . . , and STB-N 412$_N$ coupled to a display system 420$_N$. The server 402 may comprise a hard disk 404, a FEC server portion 406 and an audio/video (AV) streamer 408. Each of the clients may comprise an AV decoder, a FEC client portion and a network driver. For example, STB-1 may comprise an AV decoder 414$_1$, FEC client portion 416$_1$ and a network driver 418$_1$. STB-2 may comprise an AV decoder 414$_2$, FEC client portion 416$_2$ and a network driver 418$_2$. Similarly, STB-N may comprise an AV decoder 414$_N$, FEC client portion 416$_N$ and a network driver 418$_N$.

The plurality of clients, for example, STB-1 412$_1$, STB-2 412$_2$, . . . , and STB-N 412$_N$ may be coupled to the server 402 via a network 410. The network 410 may be a wired network, for example, an Ethernet network or a media over coaxial cable (MOCA) network and/or a wireless network. The exemplary client-server communication system may be embodied in, for example, a home LAN or a corporate LAN with a network bandwidth and capacity that may be higher than the required bandwidth for playing smooth audio or video applications.

The server 402 may comprise suitable logic, circuitry and/or code that may be enabled to transmit and/or receive audio, video and/or networking data packets via satellite, cable and/or a DSL/cable modem, for example. The server 402 may be a digital media server (DMS), for example.

The AV streamer 408 may comprise suitable logic, circuitry and/or code that may be enabled to broadcast audio and/or video data packets to a plurality of clients, for example, STB-1 412$_1$, STB-2 412$_2$, . . . , and STB-N 412$_N$ via multicast IP network delivery using a sequence number oriented protocol, for example, real-time transport protocol (RTP) over user datagram protocol (UDP). The RTP protocol may support data transfer to multiple destinations using multicast distribution.

The hard disk 404 may comprise suitable logic, circuitry and/or code that may be enabled to store the plurality of audio and/or video data packets to be broadcast to the plurality of clients, for example, STB-1 412$_1$, STB-2 412$_2$, . . . , and STB-N 412$_N$. The FEC server portion 406 may comprise suitable logic, circuitry and/or code that may be enabled to generate a plurality of FEC packets associated with the plurality of data packets. The FEC server portion 406 may be enabled to transmit one or more FEC packets periodically via a sideband after a particular number of the plurality of data packets are transmitted by the AV streamer 408. For example, at least one FEC packet may be transmitted periodically after transmitting $2^N$ data packets, where N may be equal to a number of lost data packets.

The network driver, for example, network driver 418$_1$ may comprise suitable logic, circuitry and/or code that may be enabled to receive the plurality of data packets from the AV streamer 408 and the plurality of FEC packets from the FEC server portion 406. The network driver 418$_1$ may be enabled to copy or DMA the received FEC packets to the FEC client portion 416$_1$. The network driver 418$_1$ may be enabled to copy or DMA the received data packets to the AV decoder 414$_1$.

The AV decoder, for example, AV decoder 414$_1$ may comprise suitable logic, circuitry and/or code that may be enabled to decode the received plurality of data packets from the AV streamer 408 and the received plurality of FEC packets from the FEC server portion 406. The FEC packets and the data packets may be synchronized by a sequence number. The AV decoder 414$_1$ may be enabled to determine whether a particular FEC packet may be enabled to recover one or more lost data packets. The AV decoder 414$_1$ may be enabled to transmit the received data stream to one or more display systems, for example, display system 420$_1$. The display systems, for example, display system 420$_1$ may comprise suitable logic, circuitry and/or code that may be enabled to receive and display the received AV data stream.

The FEC client portion, for example, the FEC client portion 416$_1$ may comprise suitable logic, circuitry and/or code that may be enabled to receive the plurality of FEC packets. The FEC client portion 416$_1$ may be enabled to associate the received FEC packets with the corresponding received data packets to check for lost data packets. The lost data packets may be due to momentary congestion or due to link layer interference and physical layer impairments, for example.

The plurality of clients, for example, STB-1 412$_1$, STB-2 412$_2$, . . . , and STB-N 412$_N$ may be enabled to handle delayed or out of order data and/or FEC packets. In accordance with an embodiment of the invention, the oldest lost data packets may be recovered first as these data packets may be pushed to the upper layer first. The later arriving data packets in the queue may be subsequently recovered by later arriving FEC packets. Each FEC packet may be enabled to recover one or more lost data packets within a selected subset of data packets. The burstiness of the data packets from a FEC block may be reduced by dequeuing a corresponding data packet from a queue as each data packet is queued.

Figure 5:
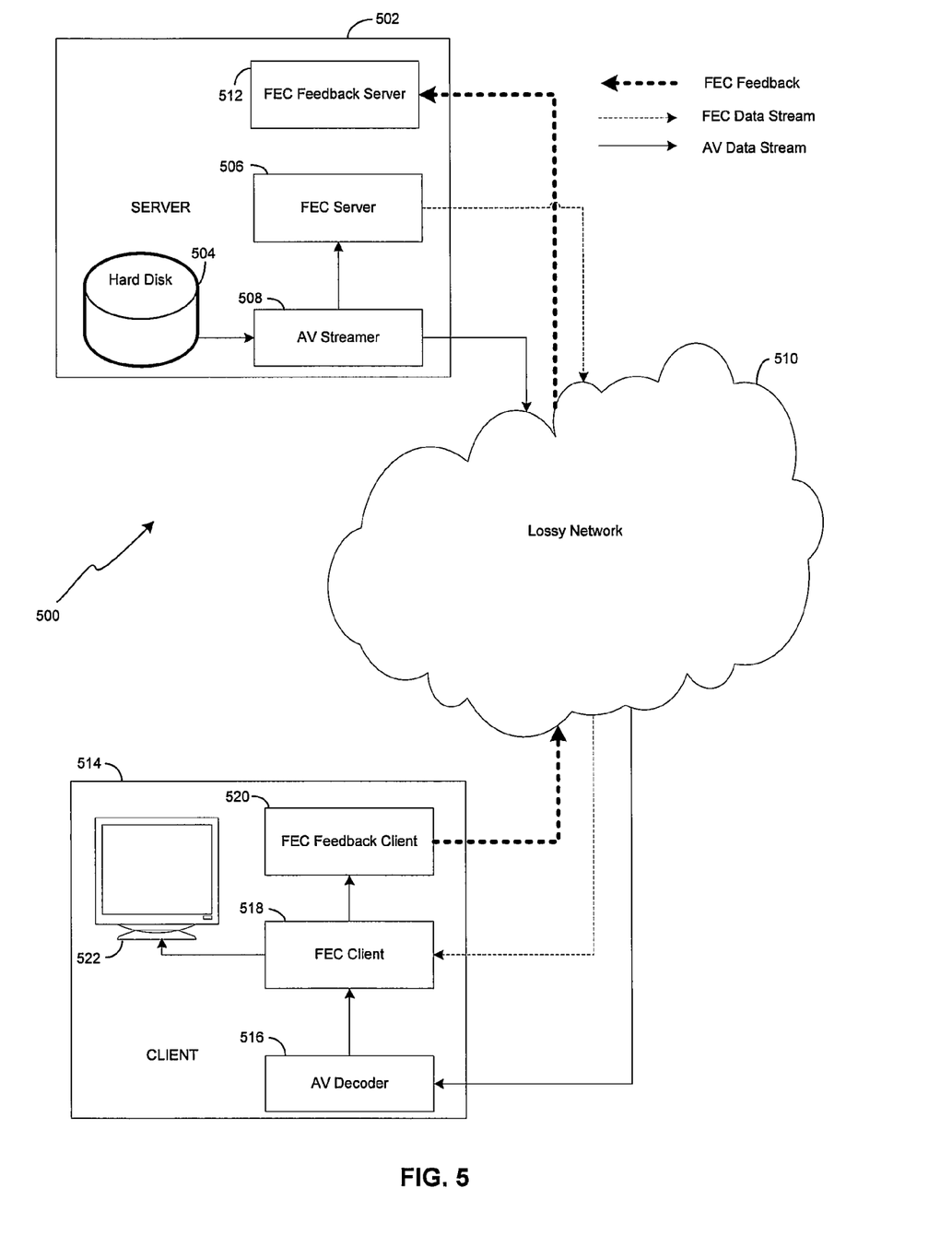
FIG. 5 is a block diagram of an exemplary client-server communication system illustrating a packet loss feedback mechanism, in accordance with an embodiment of the invention.

FIG. 5 is a block diagram of an exemplary client-server communication system illustrating a packet loss feedback mechanism, in accordance with an embodiment of the invention. Referring to FIG. 5, there is shown a client-server communication system 500. The client-server communication system 500 may comprise a server 502, a network 510 and a client 514. The server 502 may comprise a hard disk 504, a FEC server portion 506, a FEC feedback server portion 512 and an audio/video (AV) streamer 508. The client 514 may comprise an AV decoder 516, a FEC client portion 518, a FEC feedback client portion 520 and a display device 522.

The client 514 may be coupled to the server 502 via the network 510. The network 510 may be a wired network, for example, an Ethernet network or a media over coaxial cable (MOCA) network and/or a wireless network. The exemplary client-server communication system may be embodied in, for example, a home LAN or a corporate LAN.

The server 502 may comprise suitable logic, circuitry and/or code that may be enabled to transmit and/or receive audio, video and/or networking data packets via satellite, cable and/or a DSL/cable modem, for example. The server 502 may be a digital media server (DMS), for example. The server 502 may be enabled to specify a particular port to receive the upstream FEC packets from the client 514. The client 514 may be enabled to use a lower layer protocol stack feedback mechanism, for example, using acknowledgement (ACK) packets over TCP/IP or a higher layer application level mechanism for communicating upstream FEC packets to the server 502.

The AV streamer 508 may comprise suitable logic, circuitry and/or code that may be enabled to broadcast audio and/or video data packets to the client 514 via unicast and/or multicast IP network delivery using a sequence number oriented protocol, for example, real-time transport protocol (RTP) over user datagram protocol (UDP). Notwithstanding, the invention may not be so limited and other suitable sequence number oriented protocols may be utilized for multicast IP network delivery of data packets.

The hard disk 504 may comprise suitable logic, circuitry and/or code that may be enabled to store the plurality of audio and/or video data packets to be broadcast to the client 514. The FEC server portion 506 may comprise suitable logic, circuitry and/or code that may be enabled to generate a plurality of FEC packets associated with the plurality of data packets. The FEC server portion 506 may be enabled to transmit one or more FEC packets periodically via a sideband after a particular number of the plurality of data packets are transmitted by the AV streamer 508. For example, at least one FEC packet may be transmitted periodically after transmitting $2^N$ data packets, where N may be equal to a number of lost data packets.

The AV decoder 516 may comprise suitable logic, circuitry and/or code that may be enabled to decode the received plurality of data packets from the AV streamer 508. The FEC packets and the data packets may be synchronized by a sequence number. The AV decoder 516 may be enabled to determine whether a particular FEC packet may be enabled to recover one or more lost data packets. The AV decoder 516 may be enabled to transmit the received data stream to one or more display systems, for example, display system 522.

The FEC client portion 518 may comprise suitable logic, circuitry and/or code that may be enabled to receive the plurality of FEC packets from the FEC server portion 506. The FEC client portion 518 may be enabled to associate the received FEC packets with the corresponding received data packets to check for lost data packets. The lost data packets may be due to momentary congestion or due to link layer interference and physical layer impairments, for example.

The FEC feedback client portion 520 may comprise suitable logic, circuitry and/or code that may be enabled to transmit upstream FEC packets back to the server 502 if the rate of occurrence of lost data packets exceeds a particular threshold value. The FEC feedback server portion 512 may comprise suitable logic, circuitry and/or code that may be enabled to increase or decrease the FEC packet insertion rate dynamically at the server 502 to improve error correction at the client 514. The threshold for an optimum number of FEC packets to be transmitted by the FEC server portion 506 may depend on current network conditions. The FEC feedback server portion 512 may be enabled to control the insertion rate of the FEC packets by the FEC server portion 506.

The FEC feedback server portion 512 may be enabled to accommodate a client, for example, client 514 requesting the highest FEC packet rate among multiple clients based on the rate of occurrence of lost packets at the particular client 514. In accordance with an embodiment of the invention, a predefined bandwidth rate may be set at the server 502 to regulate the transmission of data packets along with the FEC packets. The server 502 may be enabled to respond to upstream FEC feedback requests within one or more packet transmission times, for example, one round trip time of a packet, in order to transmit additional FEC packets to clients, for example, client 514.

In accordance with another embodiment of the invention, one or more urgent packets may be communicated to the server 502. The server 502 may be enabled to transmit one or more FEC packets in order to recover one or more specific lost data packets in response to the received one or more urgent packets. In accordance with another embodiment of the invention, the FEC feedback server portion 512 may be enabled to decrease the FEC packet insertion rate for transmission of FEC packets to the client 514, if the rate of occurrence of lost data packets at a particular client 514 decreases below a particular threshold value. In accordance with another embodiment of the invention, the FEC feedback server portion 512 may be enabled to decrease the FEC packet insertion rate for transmission of FEC packets to the client 514 after a particular time period utilizing a slow time constant, for example, 1 second in order to conserve server 502 resources and/or bandwidth.

Figure 6:
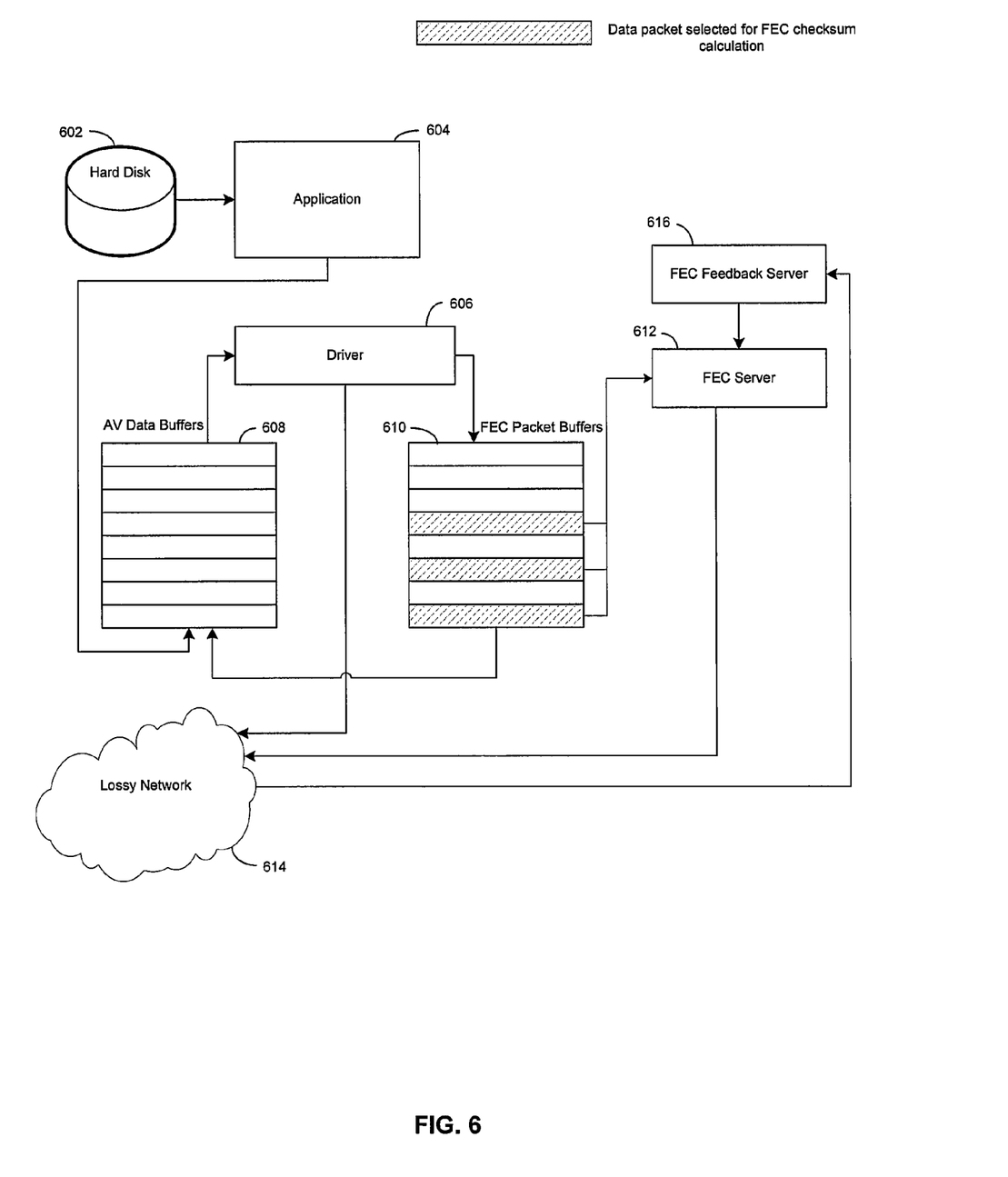
FIG. 6 is a block diagram of an exemplary server portion of a client-server communication system illustrating adjusting forward error correction (FEC) rate to adapt for time varying network impairments in video streaming applications over IP networks, in accordance with an embodiment of the invention.

FIG. 6 is a block diagram of an exemplary server portion of a client-server communication system illustrating adjusting forward error correction (FEC) rate to adapt for time varying network impairments in video streaming applications over IP networks, in accordance with an embodiment of the invention. Referring to FIG. 6, there is shown a hard disk 602, an application block 604, a driver 606, a plurality of AV data buffers 608, a plurality of FEC packet buffers 610, a FEC server portion 612, a network 614 and a FEC feedback server portion 616.

The hard disk 602 may comprise suitable logic, circuitry and/or code that may be enabled to store the plurality of audio and/or video data packets to be broadcast to the plurality of clients, for example, client 514 via the network 614. The network 614 may be a wired network, for example, an Ethernet network or a media over coaxial cable (MOCA) network and/or a wireless network. The application block 604 may be enabled to process the plurality of stored data packets based on a type of application, for example, audio and/or video applications and queue the plurality of data packets to be transmitted in the plurality of AV data buffers 608. The plurality of AV data buffers 608 may comprise suitable logic, circuitry and/or code that may be enabled to queue and store the plurality of audio and/or video data packets to be broadcast to the plurality of clients, for example, client 514.

The driver 606 may comprise suitable logic, circuitry and/or code that may be enabled to receive the plurality of data packets from the plurality of AV data buffers 608. The driver 606 may be enabled to copy or DMA the received plurality of data packets to a plurality of network packet buffers to transmit the plurality of data packets to the plurality of clients, for example, client 514. The driver 606 may be enabled to queue the transmitted data packets in the plurality of FEC packet buffers 610.

The FEC server portion 612 may comprise suitable logic, circuitry and/or code that may be enabled to generate a plurality of FEC packets based on a selected subset of the plurality of data packets stored in the plurality of FEC packet buffers 610. The FEC server portion 612 may be enabled to transmit one or more generated FEC packets periodically to the plurality of clients, for example, client 514 via a sideband.

The FEC feedback server portion 616 may comprise suitable logic, circuitry and/or code that may be enabled to increase or decrease the FEC packet insertion rate dynamically at the FEC server portion 612 to improve error correction at one or more clients, for example, client 514.

In accordance with another embodiment of the invention, one or more urgent packets may be communicated to the FEC feedback server portion 616. The FEC feedback server portion 616 may be enabled to instruct the FEC server portion 612 to transmit one or more FEC packets in order to recover one or more specific lost data packets in response to the received one or more urgent packets. The FEC feedback server portion 616 may be enabled to determine whether a particular client, for example, client 514 requesting one or more FEC packets in order to recover one or more specific lost data packets via an urgent packet may be able to recover the specific lost data packets in the future based on one or more FEC packets to be transmitted by the FEC server portion 612 in the future.

The FEC feedback server portion 616 may be enabled to ignore one or more urgent packets received from a particular client, for example, client 514 if the particular client, for example, client 514 may be enabled to recover the specific lost data packets in the future. The FEC feedback server portion 616 may be enabled to instruct the FEC server portion 612 to transmit one or more FEC packets with an intermediate sequence number based on a received urgent packet from a client, for example, client 514. The FEC feedback server portion 616 may be enabled to instruct the FEC server portion 612 to transmit one or more FEC packets in response to one or more received urgent packets, if the client 514 is unable to recover the specific lost data packets in the future.

Figure 7A:
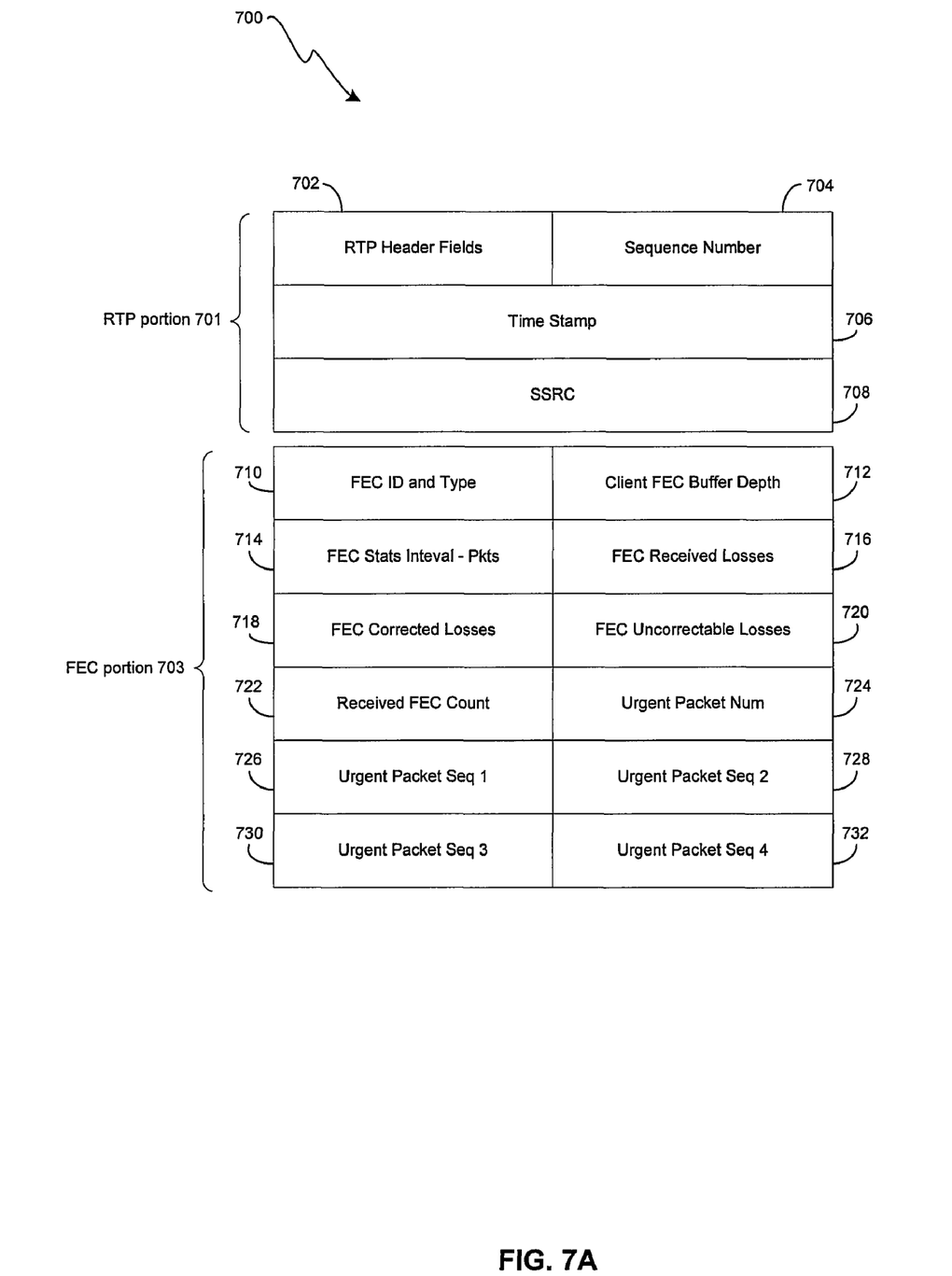
FIG. 7A is a diagram illustrating an exemplary packet structure of an upstream FEC packet, in accordance with an embodiment of the invention.

FIG. 7A is a diagram illustrating an exemplary packet structure of an upstream FEC packet, in accordance with an embodiment of the invention. Referring to FIG. 7A, there is shown an upstream FEC packet 700. The upstream FEC packet 700 may comprise a RTP portion 701 and a FEC portion 703. The RTP portion 701 may comprise a RTP header field portion 702, a sequence number field 704, a time stamp field 706 and a synchronization source (SSRC) field among other fields. The FEC portion 703 may comprise FEC ID and type field 710, a client FEC buffer depth field 712, a FEC statistics (STATS) interval field 714, a FEC received field 716, a FEC corrected losses field 718, a FEC uncorrectable losses field 720, a received FEC count field 722, an urgent packet number field 724, one or more urgent packet sequence number fields, for example, urgent packet sequence number 1 field 726, urgent packet sequence number 2 field 728, urgent packet sequence number 3 field 730 and urgent packet sequence number 4 field 732.

The RTP header field portion 702 may comprise a plurality of fields, for example, a version field that identifies the version of the RTP, a padding field that indicates whether the packet comprises one or more additional zeros that are not part of the payload. The sequence number field 704 may correspond to the last received valid RTP sequence number of the previously transmitted data packet. The time stamp field 706 may be utilized optionally to determine when to transmit additional FEC packets.

The SSRC field 708 and a contributing source (CSRC) field may be enabled to indicate a call back address and port for receiving upstream FEC packets. The CSRC field may be enabled to indicate a difference between downstream RTP packets and upstream RTP packets. The SSRC field 708 may be utilized to notify a type of an upstream FEC packet corresponding to a particular downstream FEC packet. The payload of the RTP upstream packets may have a fixed length field for reporting statistics of lost data packet recovery. The FEC ID and type field 710 may comprise a pre-determined enumeration that may be known both to the client 514 and the server 502 in order to identify the particular FEC protocol and the particular profile being used. The FEC ID and type field 710 may be a 16 bit unsigned number, for example. The FEC ID and type field 710 may be enabled to identify the interleave I and depth D of the FEC checksum calculation.

The client FEC buffer depth field 712 may be utilized by the client 514 in order to specify the required buffer depth of the previously transmitted data packets for computation. The client 514 may be enabled to increase the buffer depth for holding received data packets before passing them to upper layers. The server 502 may be enabled to transmit a particular FEC packet in order to recover lost data packets based on the client FEC buffer depth. The client FEC buffer depth field 712 may be a 16 bit unsigned number, for example.

The FEC STATS interval field 714 may indicate a time or packet interval for statistics reporting, for example, 1024 previously transmitted data packets. The FEC STATS interval field 714 may be a 16 bit unsigned number, for example and may specify the packet interval over which the other STATS fields may apply. The FEC STATS interval field 714 may also indicate whether a lost data packet is beyond a current FEC range.

The FEC received losses field 716 may indicate a number of previously transmitted data packets that are lost in transit. The FEC corrected losses field 718 may include the number of lost data packets recovered via one or more FEC packets and may be a 16 bit number, for example. The FEC uncorrectable losses field 720 may include the number of data packets lost in transit and queued in a current FEC holding buffer and may be a 16 bit number, for example. The received FEC count field 722 may include the number of FEC packets received and may be a 16 bit number, for example.

The urgent packet number field 724 may include the number of urgent packets requested by a particular client. For example, client 514 may communicate an upstream FEC packet to the server 502 with 3 urgent packet requests and the urgent packet number field 724 may be include the value 3. The one or more urgent packet sequence number fields, for example, urgent packet sequence number 1 field 726, urgent packet sequence number 2 field 728, urgent packet sequence number 3 field 730 and urgent packet sequence number 4 field 732 may comprise the sequence numbers of the particular FEC packets requested by the client 514 in order of priority in order to recover specific lost data packets.

Figure 7B:
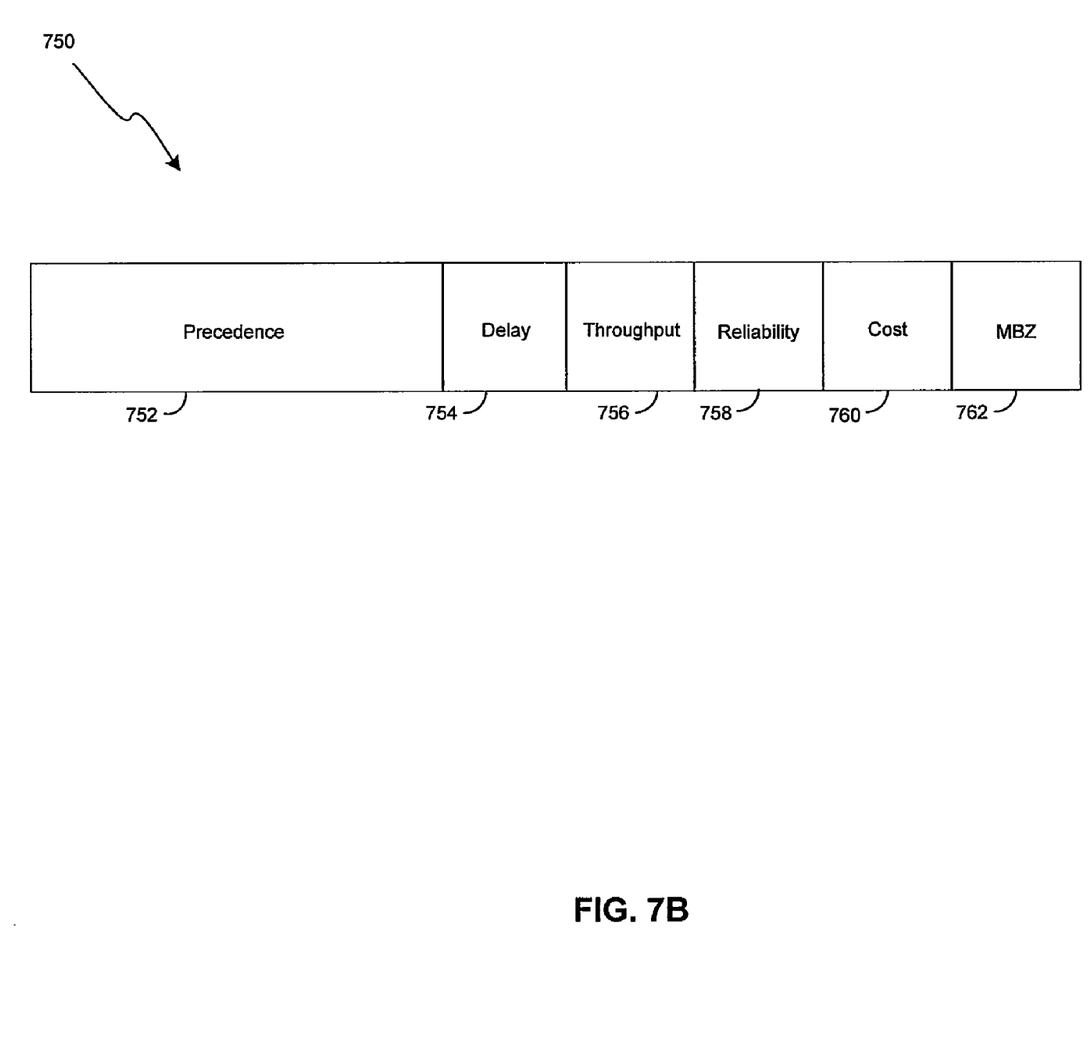
FIG. 7B is a diagram illustrating an exemplary structure of an IP type of service (TOS) field for an upstream FEC packet, in accordance with an embodiment of the invention.

FIG. 7B is a diagram illustrating an exemplary structure of an IP type of service (TOS) field for an upstream FEC packet, in accordance with an embodiment of the invention. Referring to FIG. 7B, there is shown an IP TOS field 750 for an upstream FEC packet 700. The IP TOS field 750 may comprise a precedence field 752, a delay field 754, a throughput field 756, a reliability field 758, a cost field 760 and a MBZ field 762.

The IP TOS field 750 may be utilized to mark a traffic class of the upstream FEC packets 700. The FEC packets transmitted periodically by the FEC server portion 612 may be marked high reliability, for example, via the IP TOS field 750. The urgent packet requests may be marked low delay and high reliability, for example. Table 1 illustrates the various values of the precedence field 752 and the corresponding precedence level.

TABLE 1

| Precedence field | Precedence level |
|---|---|
| 000 (0) | Routine |
| 001 (1) | Priority |

TABLE 1-continued

| Precedence field | Precedence level |
| --- | --- |
| 010 (2) | Immediate |
| 011 (3) | Flash |
| 100 (4) | Flash Override |
| 101 (5) | Critical |
| 110 (6) | Internetwork Control |
| 111 (7) | Network Control |

The delay field 754 may indicate low delay of transmission of FEC packets when set to 1, for example. The throughput field 756 may indicate high throughput of transmission of FEC packets when set to 1, for example. The reliability field 758 may indicate high reliability of transmission of FEC packets when set to 1, for example. The cost field 760 may indicate low cost of transmission of FEC packets when set to 1, for example. The MBZ field 762 may include a checking bit, for example.

Figure 8:
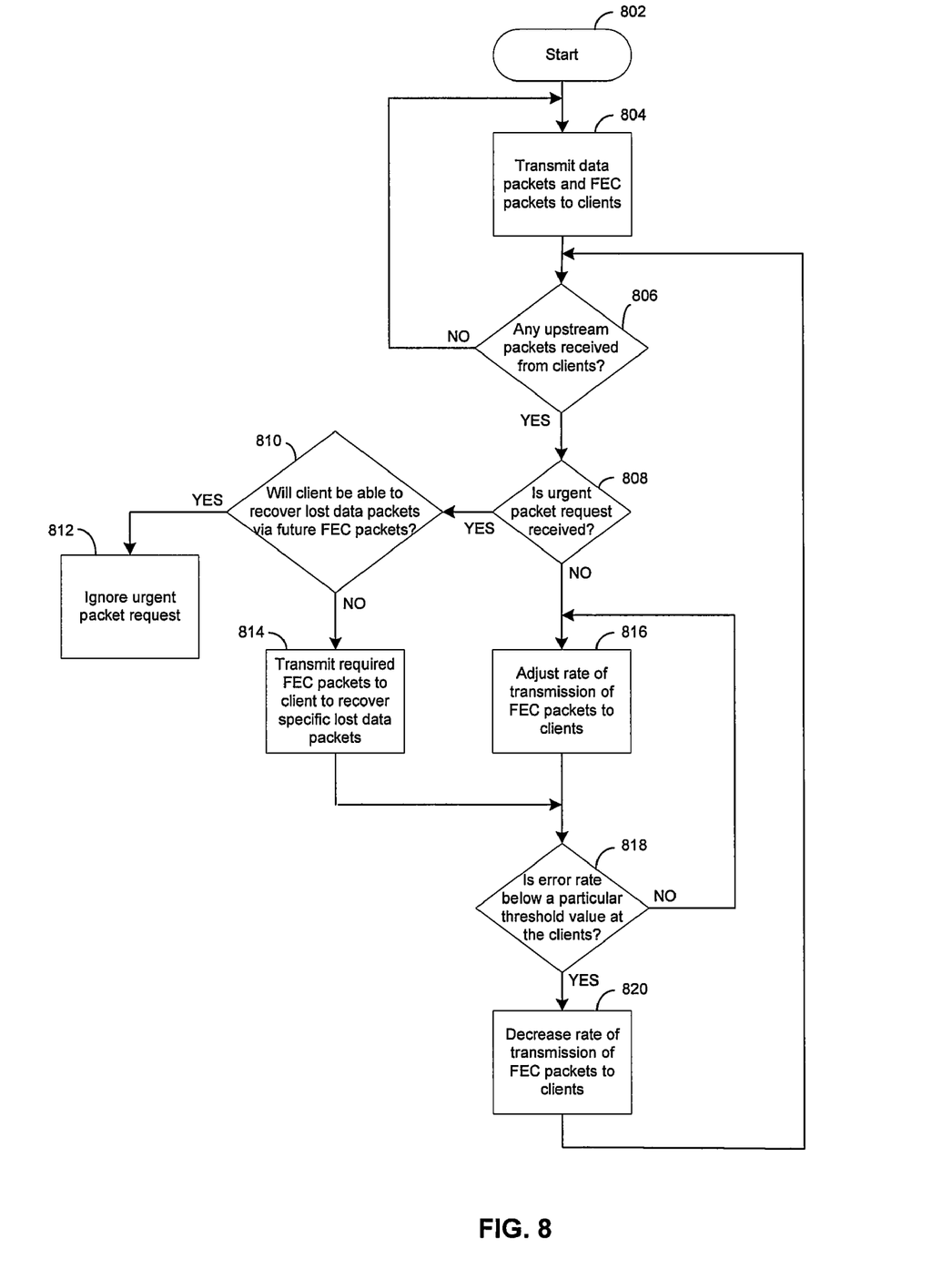
FIG. 8 is a flowchart illustrating exemplary steps for dynamically adjusting FEC rate to adapt for time varying network impairments in video streaming applications over IP networks, in accordance with an embodiment of the invention.

FIG. 8 is a flowchart illustrating exemplary steps for dynamically adjusting FEC rate to adapt for time varying network impairments in video streaming applications over IP networks, in accordance with an embodiment of the invention. Referring to FIG. 8, exemplary steps may begin at step 802. In step 804, a server 502 may be enabled to transmit and/or receive audio, video and/or networking data packets via satellite, cable and/or a DSL/cable modem, for example. The FEC server portion 506 may be enabled to generate a plurality of FEC packets associated with the plurality of data packets and transmit one or more FEC packets via a sideband to a plurality of clients, for example, client 514.

In step 806, the server 502 may be enabled to determine whether it has received one or more upstream FEC packets from one or more clients. If the server 502 has not received one or more upstream FEC packets from one or more clients, control returns to step 804. If the server 502 has received one or more upstream FEC packets from one or more clients, control passes to step 808.

In step 808, it may be determined whether one of the received upstream FEC packets is an urgent packet. If one of the received upstream FEC packets is an urgent packet, control passes to step 810. In step 810, it may be determined whether the requesting client, for example, client 514 may be able to recover one or more particular lost data packets via the FEC packets to be transmitted by the server 502 in the future. If the server 502 determines that the requesting client, for example, client 514 may be able to recover one or more particular lost data packets via the FEC packets to be transmitted by the server 502 in the future, control passes to step 812. In step 812, the urgent packet may be ignored by the server 502. If the server 502 determines that the requesting client, for example, client 514 may not be able to recover one or more particular lost data packets via the FEC packets to be transmitted by the server 502 in the future, control passes to step 814. In step 814, the server 502 may be enabled to transmit one or more FEC packets in order to recover one or more specific lost data packets in response to the received urgent packet. Control then passes to step 818. If one of the received upstream FEC packets is not an urgent packet, control passes to step 816.

In step 816, the server 502 may be enabled to dynamically adjust a rate of transmission of forward error correction (FEC) packets to one or more clients, for example, client 514 based on receiving the upstream FEC packet from the client 514. In step 818, it may be determined whether a rate of occurrence of lost data packets at one or more clients is below a particular threshold value. If the rate of occurrence of lost data packets at one or more clients is not below a particular threshold value, control returns to step 816. If the rate of occurrence of lost data packets at one or more clients is below a particular threshold value, control passes to step 820. In step 820, the server 502 may be enabled to decrease the rate of transmission of the FEC packets to one or more clients, for example, client 514 after a particular time period based on a time constant. Control then returns to step 806.

In accordance with an embodiment of the invention, a method and system for dynamically adjusting a forward error correction (FEC) rate to adapt for time varying network impairments in video streaming applications over IP networks may be disclosed. At a server side, for example, server 502 of a client-server communication system 500, the FEC feedback server portion 512 may be enabled to dynamically adjust a rate of transmission of forward error correction (FEC) packets to one or more clients, for example, client 514 based on receiving at least one upstream FEC packet from the FEC feedback client portion 520 of client 514. The FEC feedback server portion 512 may be enabled to increase the rate of transmission of the FEC packets to the clients, for example, client 514 when a rate of occurrence of lost data packets at client 514 is above a particular threshold value. The threshold value may be, for example, 3 lost data packets for every 100 received data packets. The FEC feedback server portion 512 may be enabled to receive upstream FEC packets comprising an urgent packet requesting transmission of a particular FEC packet in order to recover one or more particular lost data packets.

The server 502 may be enabled to determine whether one or more clients transmitting the urgent packet may be able to recover one or more particular lost data packets via the FEC packets to be transmitted by the server side, for example, server 502 of the client-server communication system 500. The server 502 may be enabled to ignore the urgent packet, if the server 502 determines that one or more clients transmitting the urgent packet will be able to recover one or more particular lost data packets via the FEC packets to be transmitted. The FEC feedback server portion 512 may be enabled to decrease the rate of transmission of the FEC packets to one or more clients, for example, client 514 when a rate of occurrence of lost data packets is below a particular threshold value. The FEC feedback server portion 512 may be enabled to decrease the rate of transmission of the FEC packets to one or more clients, for example, client 514 after a particular time period based on a time constant.

The FEC packets may be transmitted periodically via a sideband to one or more clients, for example, client 514. For example, an FEC packet may be transmitted after every 8 data packets. The periodicity of transmitting the FEC packets may be adjusted based on a rate of occurrence of the lost data packets. The FEC server portion 506 may be enabled to generate the FEC packets based on at least one selected subset of a plurality of data packets transmitted to the plurality of clients, for example, client 514.

The plurality of data packets may be transmitted by a server, for example, the server 502 via a unicast network and/or a multicast network connection. The plurality of data packets may be transmitted by the server 502 via one or more wired network connections, for example, an Ethernet network 212 or via a wireless network connection, for example, wireless network 214. Notwithstanding, the invention may not be so limited and the server 502 may be enabled to transmit the plurality of data packets via other wired and/or wireless networks.

Another embodiment of the invention may provide a machine-readable storage, having stored thereon, a computer program having at least one code section executable by a machine, thereby causing the machine to perform the steps as described above for dynamically adjusting a forward error correction (FEC) rate to adapt for time varying network impairments in video streaming applications over IP networks.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for recovering data packets, the method comprising:
   at a server side of a client-server communication system:
   dynamically adjusting a rate of transmission of forward error correction (FEC) packets to one or more clients based on at least one upstream FEC packet received from said one or more clients, wherein said one or more clients:
   select from a plurality of data packets received from said server side, based on a binary search algorithm, a subset of said received plurality of data packets; and
   generate a FEC checksum based on said selected subset of said received plurality of data packets.

2. The method according to claim 1, comprising transmitting said FEC packets in order to recover one or more lost data packets at said one or more clients.

3. The method according to claim 2, comprising increasing said rate of transmission of said FEC packets to said one or more clients when a rate of occurrence of said one or more lost data packets is above a particular threshold value.

4. The method according to claim 3, wherein said at least one upstream FEC packet comprises an urgent packet requesting transmission of a particular FEC packet in order to recover one or more particular lost data packets.

5. The method according to claim 4, comprising determining whether said one or more clients transmitting said urgent packet is able to recover said one or more particular lost data packets via said FEC packets to be transmitted by said server side of said client-server communication system.

6. The method according to claim 5, comprising ignoring said urgent packet when said one or more clients transmitting said urgent packet is able to recover said one or more particular lost data packets via said FEC packets to be transmitted.

7. The method according to claim 2, comprising decreasing said rate of transmission of said FEC packets to said one or more clients when a rate of occurrence of said one or more lost data packets is below a particular threshold value.

8. The method according to claim 1, comprising decreasing said rate of transmission of said FEC packets to said one or more clients after a particular time period based on a time constant.

9. The method according to claim 1, comprising periodically transmitting said FEC packets via a sideband to said one or more clients.

10. The method according to claim 1, comprising generating said FEC packets based on said selected subset of a plurality of said data packets transmitted to said one or more clients.

11. The method according to claim 10, comprising transmitting said plurality of said data packets via one or more of: a wired connection and a wireless connection.

12. The method according to claim 11, comprising transmitting said plurality of said data packets over a multicast network.

13. A system for recovering data packets, the system comprising:
   one or more circuits at a server side of a client-server communication system that enable:
   dynamic adjustment of a rate of transmission of forward error correction (FEC) packets to one or more clients based on at least one upstream FEC packet received from said one or more clients, wherein said one or more clients:
   select from a plurality of data packets received from said server side, based on a binary search algorithm, a subset of said received plurality of data packets; and
   generate a FEC checksum based on said selected subset of said received plurality of data packets.

14. The system according to claim 13, wherein said one or more circuits enable transmission of said FEC packets in order to recover one or more lost data packets at said one or more clients.

15. The system according to claim 14, wherein said one or more circuits enable increasing said rate of transmission of said FEC packets to said one or more clients when a rate of occurrence of said one or more lost data packets is above a particular threshold value.

16. The system according to claim 15, wherein said at least one upstream FEC packet comprises an urgent packet requesting transmission of a particular FEC packet in order to recover one or more particular lost data packets.

17. The system according to claim 16, wherein said one or more circuits enable determining whether said one or more clients transmitting said urgent packet is able to recover said one or more particular lost data packets via said FEC packets to be transmitted by said server side of said client-server communication system.

18. The system according to claim 17, wherein said one or more circuits enable ignoring said urgent packet, when said one or more clients transmitting said urgent packet is able to recover said one or more particular lost data packets via said FEC packets to be transmitted.

19. The system according to claim 14, wherein said one or more circuits enable decreasing said rate of transmission of said FEC packets to said one or more clients when a rate of occurrence of said one or more lost data packets is below a particular threshold value.

20. The system according to claim 13, wherein said one or more circuits enable decreasing said rate of transmission of said FEC packets to said one or more clients after a particular time period based on a time constant.

21. The system according to claim 13, wherein said one or more circuits enable periodic transmission of said FEC packets via a sideband to said one or more clients.

22. The system according to claim 13, wherein said one or more circuits enable generation of said FEC packets based on said selected subset of a plurality of said data packets transmitted to said one or more clients.

23. The system according to claim 22, wherein said one or more circuits enable transmission of said plurality of said data packets via one or more of: a wired connection and a wireless connection.

24. The system according to claim 23, wherein said one or more circuits enable transmission of said plurality of said data packets over a multicast network.

* * * * *